United States Patent [19]

Burton

[11] 4,086,161

[45] Apr. 25, 1978

[54] ECOLOGICAL SYSTEM AND METHOD

[76] Inventor: Robert Edward Burton, 222 Franklin, Willits, Calif. 95490

[21] Appl. No.: 750,121

[22] Filed: Dec. 13, 1976

[51] Int. Cl.² .................................................. C02C 5/10
[52] U.S. Cl. ........................................ 210/13; 210/17; 210/150; 210/242 R; 47/1.4; 119/3
[58] Field of Search .................... 210/2, 3, 11, 13, 15, 210/17, 242 R, 150, 151; 47/1.4; 119/3

[56] References Cited

U.S. PATENT DOCUMENTS

| 3,118,424 | 1/1964 | Willinger | 119/3 |
| 3,155,609 | 11/1964 | Pampel | 47/1.4 |
| 3,192,154 | 6/1965 | Burton | 210/17 |
| 3,577,678 | 5/1971 | Burton | 47/1.4 |
| 3,635,816 | 1/1972 | Golub | 210/17 |
| 3,835,039 | 9/1974 | Ciambrone | 210/17 |

Primary Examiner—Charles N. Hart
Assistant Examiner—Benoit Castel
Attorney, Agent, or Firm—Flehr, Hohbach, Test, Albritton & Herbert

[57] ABSTRACT

An ecological system and method for counteracting the effects of excessive nutrient deposition (eutrophication) in bodies of water such as marshlands, inland ponds and lakes. The system makes use of clusters of substantially individualized bark fibers positioned in upper, relatively oxygen-rich zones of such bodies of water. The bark clusters function to attract and hold excessive nutrient deposition in the form of colloidal wastes (e.g., colloidal solids of various types, single cell bacteria, etc.) and aquatic algae produced thereby, while at the same time providing a safe habitat for algae predators and feeders in the form of minute animal organisms (e.g., crustacea, rotifers, snails, zooplankton, etc). The isolation and dispersion of the bark fiber clusters on the surface of the threatened bodies of water serves to prevent a disruptive imbalance between the algae and algal feeders by providing increased areas for life and surface breeding of various types of algae predators to thereby maintain essential trophic balance.

15 Claims, 6 Drawing Figures

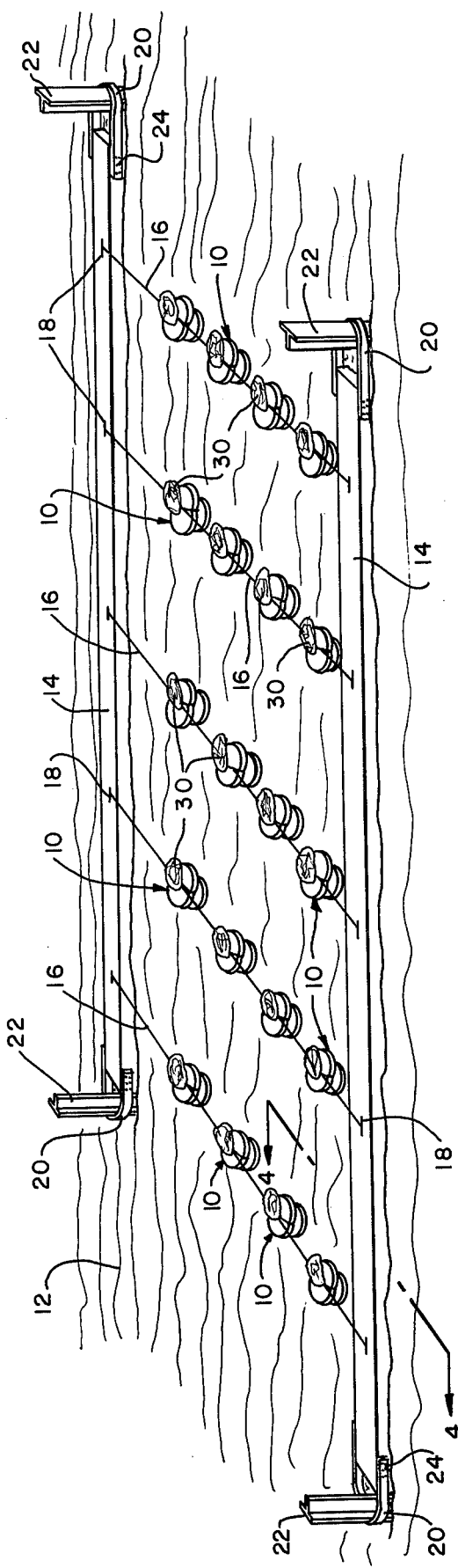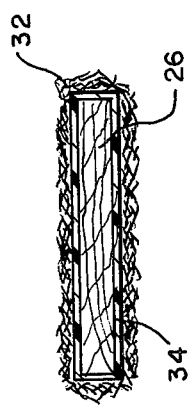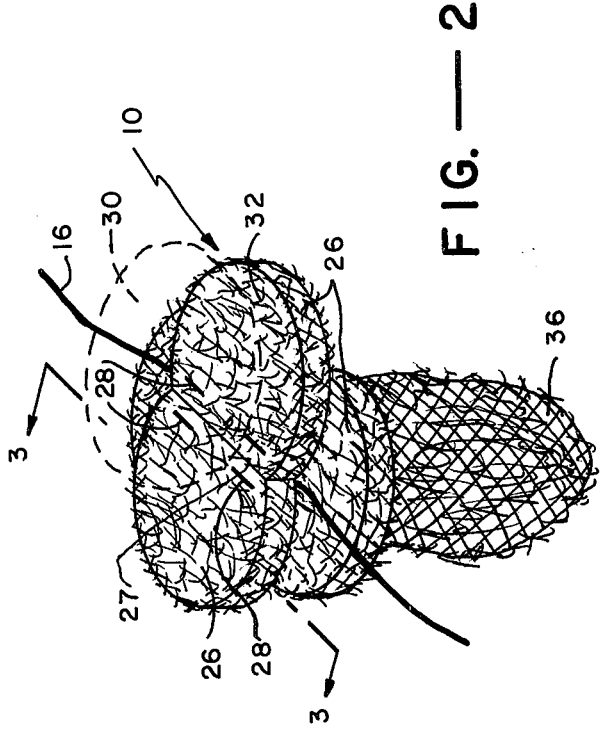
FIG. — 1
FIG. — 3
FIG. — 2

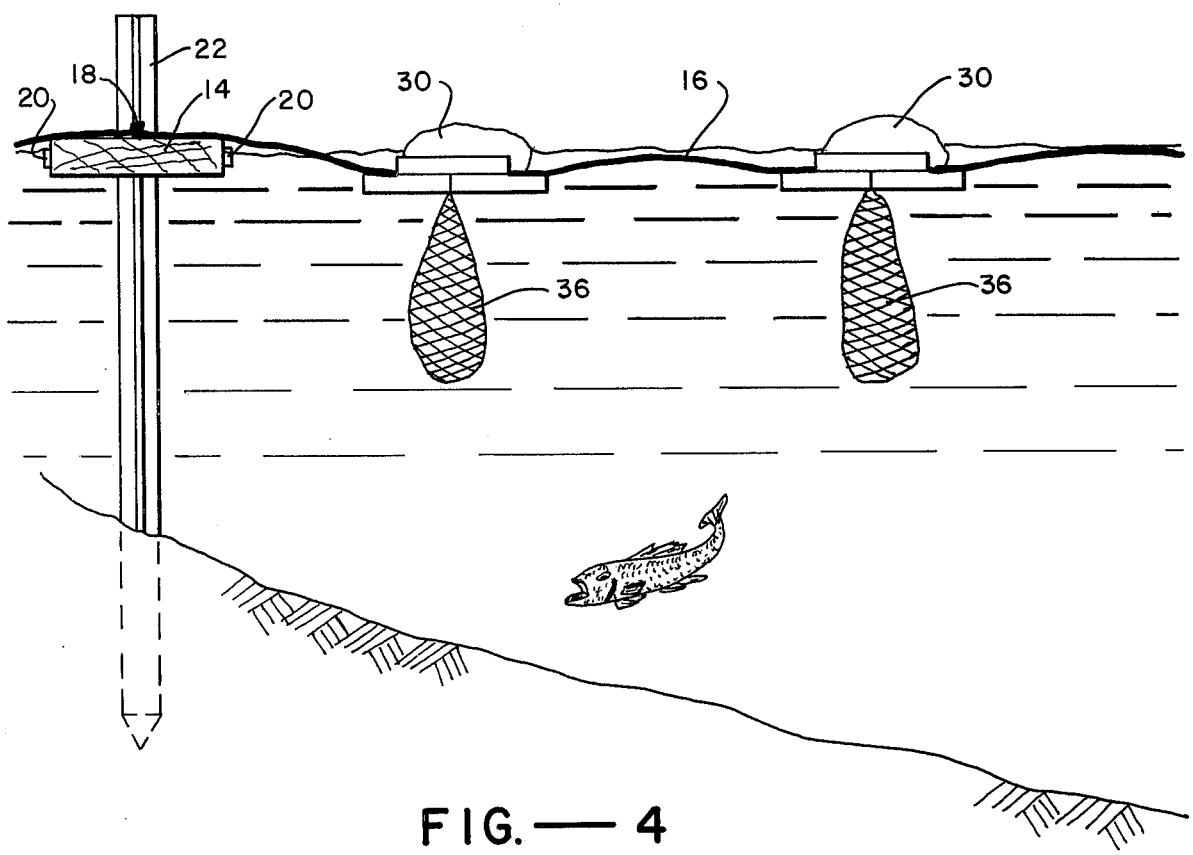
FIG.—4
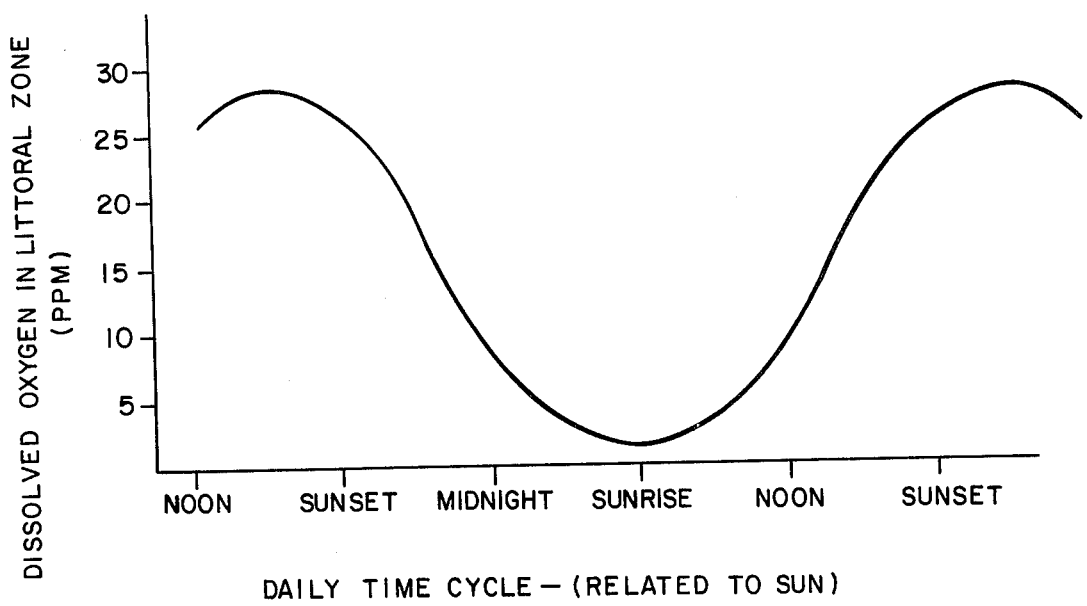
FIG.—5

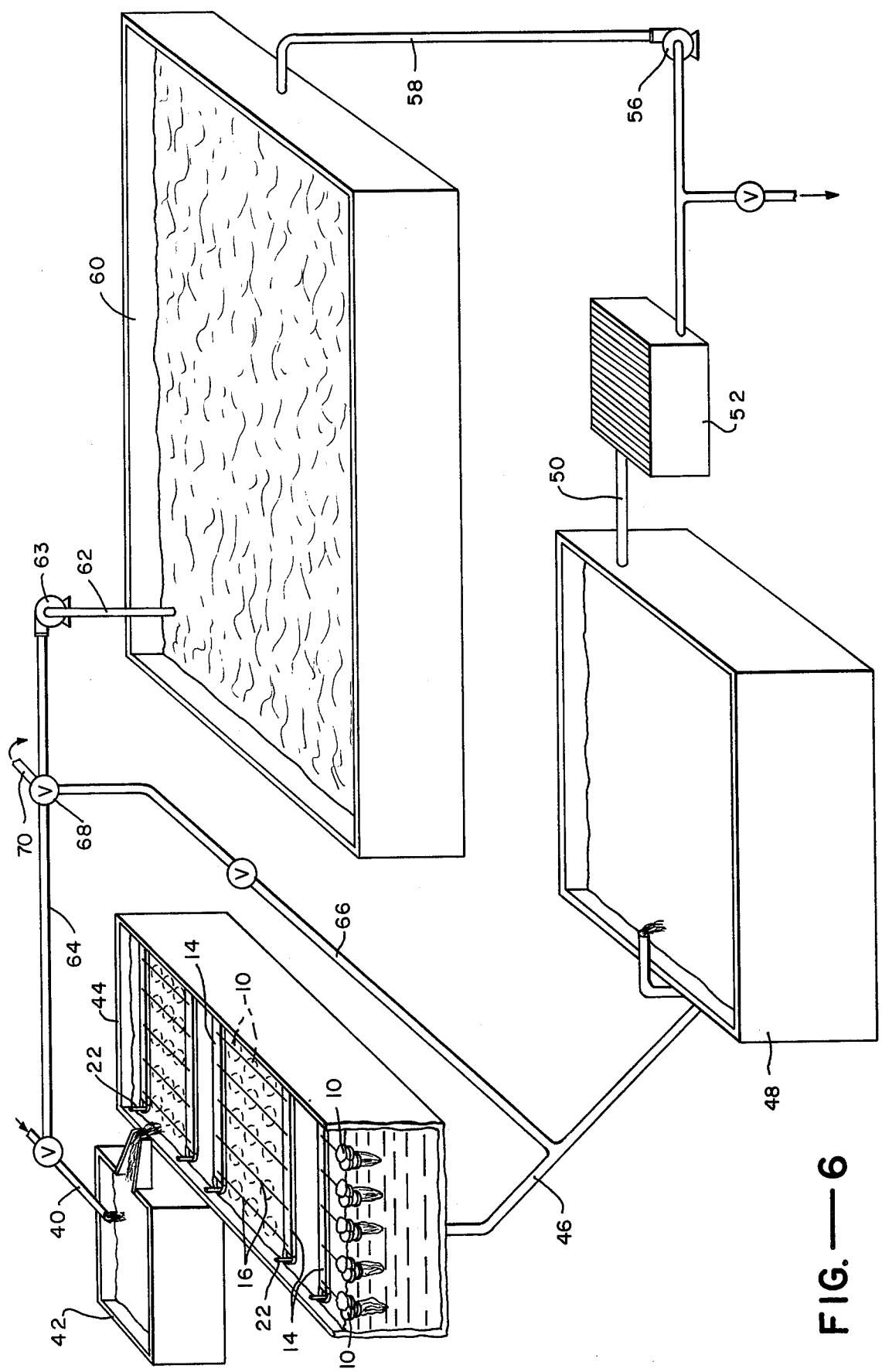
FIG.—6

ECOLOGICAL SYSTEM AND METHOD

BACKGROUND OF THE INVENTION

The necessity and importance of a balanced ecosystem is well established. The concept of managed marshlands, for example, including engineered systems for enhancement of marshlands, has received widespread attention. In general, the purpose of managed marshes, artificial wet lands and the like is to provide benefits to wild life and to man, while minimizing potentially destructive vectors. Thus a particular concern of urban and regional boards, state departments of fish and game and like governmental bodies is the establishment of guide lines for the discharge of waste waters so that alteration of environmental conditions in ponds and lakes and marshlands will not destroy natural habitats for animal life. By way of illustration, rapid increases in plant growth brought about by excessive nutrient deposition (eutrophication) in small bodies of water or peripheral portions of large bodies of water, through runoff of soil fertilizers and discharge of municipal or industrial wastes, can result in "blooms" of aquatic algae and a rapid disruption of the normal trophic balance between algae and algal feeders. Although algae are common inhabitants of surface waters, excessive quantities can be very troublesome to both wild life and to man. Because increased amounts of mineral wastes are being discharged into open bodies of water where they can be used as food by algae, many inland ponds and lakes are being smothered by algal population explosions. Such increases in algae do not pass normally into the food chain as fish and other lower forms of animal life cannot feed on algae. In the case of water supplies designed for human consumption, excessive amounts of algae can produce disagreeable odors and "fishy" tastes as well as clogging of filtration machinery.

In general, a solution to the problem of rapid algae growth caused by excessive nutrient deposition through natural and artificial waste water discharge, which will not disrupt the normal ecology of inland ponds, marshlands and the like, is highly to be desired.

SUMMARY OF INVENTION AND OBJECTS

This invention relates generally to an ecological system and method for maintaining the trophic balance between algae and algae predators in open bodies of water subject to eutrophication and more particularly relates to a system and method of such character for increasing the area and zone of living and surface breeding of algae feeders and predators, in inland ponds, lakes and marshlands.

As a general statement of the invention, I have found that a system and method for maintaining the trophic balance between algae, algal feeders and the like can be established in open bodies of water by isolating and dispersing a profusion of substantially individualized bark fibers in self-contained units or clusters in an upper zone of such body of water, adjacent to and beneath its surface. As the upper surface of still waters (even stagnant waters) is relatively rich in dissolved oxygen to depths of about ten centimeters, the distribution of the clusters of bark fibers as living and breeding areas within such zone provides a very satisfactory means for attracting algae predators. When included as part of a flotation unit near the surface of the water, the bark fibers provide convenient living and breeding cavities near the water line which serve as lures for such highly efficient aerobic scavengers as aquatic snails, crustaceans (daphnia), coleoptera (water beetles), water boatman, aquatic instars of various insects (dragon fly and damsel fly) and various other minute forms of animal life. All of these forms of life thrive only in water containing sufficient amounts of dissolved oxygen (viz., 0.5 to 2.0 parts per million $O_2$) to sustain aerobic activity. Most of these organisms also require a surface to which they can attach, safe from their enemies, and lay their eggs. In ponds and other natural bodies of the water, the described conditions exist only on the peripheral edge of the body of water (littoral zone). However, in accordance with the present invention the described essential combination of factors for successful breeding and life are provided by the float means spread across the surface of the waters, within the confines of the clusters of bark fibers. Thus, sufficient dissolved oxygen is present in the upper surface regions of the water adjacent the floats, and the bark fibers function to both attract the algae and to provide a convenient resting place for the algae predators. Moreover, as the algae thrive best where the process of photosynthesis can be successfully carried out, that is, in the surface region, the present invention positions the algae predators in precisely the area where rapid growths or "blooms" of aquatic algae are likely to occur.

It is of importance to the present invention that the algae, being colloidal solids, are naturally attracted to the bark fibers and thus are available to the colonies of algae predators living within their confines. The bark fibers also attract colloidal solids existing as pollutants, in runoff waters and municipal and industrial waters, in the first instance, to thus localize the growth of the algae in the newly created zones of algal feeders. This attraction of colloidal wastes to bark fibers, particularly redwood bark fibers, is disclosed in Burton U.S. Pat. No. 3,238,124. The use of individualized redwood bark fibers as therein described, collected in clusters or units on float means near the surface of an open body of water, is therefore a preferred means for carrying out the present invention.

A particularly satisfactory float means or apparatus for carrying out the present invention comprises a series of relatively flat units of wood or like organic flotation material to which the clusters of substantially individualized bark fibers are secured. An organic adhesive material such as coal tar or wood tar can be employed to adhere the bark fibers to the float means as essentially self-contained units, wherein the individualized bark fibers are positioned in desired spatial relationship. In addition, perforated enclosures for further clusters of bark fibers can be suspended from the float means to provide additional breeding and living areas for the algae predators. For example, I have found that bags of polyethylene mesh can be satisfactorily employed for such purpose. Additional flotation means such as plastic cellular foam can be included as part of the float means as well as pairs of spaced apart float members between which several of the fiber supporting float means can be strung or spaced. The bark fiber flotation units can also be anchored to the bottom of the body of water by posts or other means, or, alternatively, can be freely positioned on its surface.

It is a general object of the present invention, therefore, to provide a highly effective ecological system and method for maintaining the trophic balance between algae and algal feeders in open bodies of water subject to eutrophication.

Another object of the invention is to provide a method and means for such purpose which can be employed upon and beneath the surface area of inland ponds, lakes, marshlands and the like, for the purpose of attracting and supporting algae predators.

A further object of the invention is to provide an ecological system and method of the above character which is readily adapted to supporting the life functions of algae predators such as crustacea, rotifers, snails, zooplankton, and like minute organisms while at the same time readily enabling a biotic population interaction between the algae predators and the rise or fall of the algae population, in response to variations in the supply of colloidal nutrients.

Another object of the invention is to provide an ecological system and method of the above character that does not require complicated procedures or machinery and which is adaptable to virtually any type of open body of water.

Another object of the invention is to provide an ecological system and method of such character which is highly adaptable and efficient in maintaining the trophic balance between algae, algal feeders and the like in inland ponds, marshlands, lakes and similar open bodies of water subject to eutrophication, and which is readily adaptable to variations in the level of colloidal nutrients therein.

Additional objects and advantages of the invention will appear from the following description taken in conjunction with the accompanying drawings.

BRIEF DESCRIPTION OF THE DRAWINGS

FIG. 1 is a schematic representation of one system of apparatus used in carrying out the ecological method of the present invention.

FIG. 2 is a schematic representation, on an enlarged scale, of a particular bark fiber float means used in carrying out the invention, with a portion thereof shown in dotted outline.

FIG. 3 is a sectional view along the line 3—3 of FIG. 2.

FIG. 4 is a like view, along the line 4—4 of FIG. 1.

FIG. 5 is a graph illustrating a particular feature of the invention.

FIG. 6 is a schematic flow sheet illustrating another system of apparatus used in carrying out the invention.

DETAILED DESCRIPTION OF PREFERRED EMBODIMENTS

The concept of the present invention will be best understood in conjunction with a description of preferred means for carrying out my new ecological method.

In the embodiment illustrated in FIGS. 1 through 4, a plurality of organic float means 10 are shown in position on the surface of a body of water 12. The separate float means are positioned between two spaced apart float members 14 by lines or stringers 16 which, as illustrated, can be secured to the float members by any suitable means such as air-driven staples 18. The float members 14 are held in place by end straps 20 which encircle vertical stakes 22 driven or otherwise positioned in the bottom of the body of water 12 (see FIG. 4). Preferably, conventional materials of construction are employed. By way of illustration, the float members 14 can be wood, the stakes 22 can be conventional fence posts of metal or plastic, and the straps 20 can be leather, plastic, metal, composition material or the like, suitably held in place by screws, nails or other fastening means 24. The stringers 16 can likewise be nylon cord, fishline, coated wire or similar material. In general, the construction should be rugged and simple so as to withstand weathering, wave action and other natural conditions and forces. In this regard, the stringers 16 are provided with a certain degree of slackness to accommodate relative movements of the float means 10 whereas the straps 20 permit necessary vertical movements of the float members 14 with respect to the positioning stakes 22.

Referring particularly to FIGS. 2 through 4, the organic float means 10 may comprise a plurality of flat disks 26, of a specific density less than that of water, which may be suitably joined together to form a flotation unit. As illustrated, the disks 26 may be of a flattened cylindrical construction with one edge shaved off, as at 27, to provide flat adjoining surfaces which facilitate assembly. By joining two layers of disks rotated approximately 90° with respect to one another, a simple flotation unit can be assembled by means of air-driven staples or like fastening means 28. By including a portion of a tie line or stringer 16 between the disk units 26 at the time of assembly, a series of the float means 10 can be brought together for attachment between the spaced apart float members 14. (See FIGS. 1 and 2). To insure proper flotation of the units 10, additional flotation means such as blobs 30 of a plastic cellular foam or similar material having an open cellular construction, may be adhered to the upper surfaces of the disks 26. Polyurethane foam, for example, is particularly satisfactory for such purpose and may be easily adhered after mixing but before curing to the upper surface of the float means 10. In general, the added flotation material 30 includes self-contained air pockets which insure positive flotation of the float means 10.

It is a feature of the present invention that clusters of substantially individualized bark fibers are carried by the float means 10 so as to provide a convenient resting place for various types of algae predators such as crustacea, rotifers, snails, zooplankton and like minute organisms. As particularly illustrated in FIG. 3, a profusion of substantially individualized bark fibers 32 is adhered to the flat disks 26 to provide essentially self-contained clusters or units of the bark fibers on the float means 10. As hereinafter described, these clusters of bark fibers provide very satisfactory means for attracting and holding algae predators in that the spaces between the bark fibers provide convenient living and breeding cavities for a wide variety of minute aerobic organisms which are capable of converting algae and other pollutants in the body of water 12 into carbon dioxide and energy.

In the illustrated apparatus, the bark fibers 32 are secured to the disk members 26 by a suitable organic adhesive material such as a layer of coal or wood tar 34. As will be readily appreciated, the layer of tar 34 can be applied to the wood disks 26 while in a softened or molten state following which the barks fibers can be applied and adhered to the disks so that the individual fibers are positioned in desired spatial relationship to provide numerous openings and cavities between the individual fibers. As previously indicated, the bark fibers 32 are preferably redwood bark fibers which have been processed by bending and rolling shear stresses followed by shredding and dust separation operations, to provide relatively short individualized fibers adapted to use in the present invention. Procedures for obtaining redwood bark fibers of the type described are disclosed, for example, in U.S. Pat. Nos. 3,042,977 and 3,328,124. Individual fibers produced by such processing have a diameter or thickness no greater than about 1 millimeter and a length ranging from about 1 to 10 centimeters.

As further illustrated in FIGS. 2 and 4, perforated enclosures 36 capable of holding additional clusters of bark fibers can be suspended from the float means 10 to provide added breeding and living areas for the algae predators. Commercially available bags of expandable polyethylene mesh are particularly useful for this purpose, and can be easily incorporated as part of the float means 10 at the time of assembly. Thus, prior to stapling the layers of disks 26 together, the draw strings or upper closure area of the bags can be positioned between the surfaces of the disks so that, upon formation of the final unit, the bags are held firmly so as to be suspended from the underneath side of the float means 10. While individualized bark fibers can be employed within the enclosures 36, I have found that short severed sections of the bark strips which have been subjected only to the initial bending and rolling shear stresses previously described, are ideally suited for the intended purpose. Thus, as particularly described in U.S. Pat. No. 3,328,124, such strips of processed bark, while retaining the initial strip configuration, are uniquely characterized by exceptionally large internal surface areas. These internal surface areas substantially increase the total exposed surface area of the fibers in the individual strip sections to provide a remarkable enlargement of the total surface area. By way of illustration, a float means 10 of the type illustrated in FIG. 2, employing disks 26 of approximately 7-½ inches in diameter and suspended net bags filled with bark strips to a vertical dimension of about 30 centimeters and a diameter of about 4 inches, provides a total surface area for the float means in excess of 100 square feet and ranging up to 200 square feet of surface area, or more. It will be apparent therefore that each of the float means 10 provides an unusually large surface area in the form of openings and cavities which encourage the breeding and life-sustaining activities of a large variety of minute animal organisms.

The overall functioning of the ecological method and system of apparatus illustrated in FIGS. 1 to 4 will now be briefly described. Assuming an open body of water 12 in the form of an inland pond, lake, marshland, or the like, a plurality of the fiber supporting float means 10 are positioned through use of the float members 14 and stakes 22, at virtually any desired position of the surface of the body of water. In one satisfactory arrangement, the float means 10 are spaced at approximately one foot intervals by means of stringers 16 of durable plastic twine, with the individual stringers being spaced along the float members at desired intervals ranging from about 2 to 10 feet. Since the proportion of dissolved oxygen in open ponds and the like is concentrated in the surface waters to a depth of about 10 centimeters or less, the float means 10 position the clusters of bark fibers 32 in the zone of highest natural oxygen content. Although relatively movable to accommodate natural forces, the float means 10 constitute essentially stable surface areas across the surface of the pond wherein the aerobic organisms can breed and live.

As noted previously, most forms of aerobic scavengers capable of functioning as algae predators not only require sufficient dissolved oxygen to sustain life but also some form of stable support within which to hide and to lay their eggs. In the typical inland pond, the described combination of essential conditions exists only on the peripheral edge of the pond in the so-called littoral zone. According to the present invention, the float means 10 enable very substantial surface areas to be positioned anywhere on the surface of the pond, with assurance that the necessary combination of factors (i.e., essential level of dissolved oxygen and satisfactory breeding cavities) will exist in a critical zone adjacent the surface of the pond. As noted, the positioning of the fibers in the surface waters is essential because it is in this area that the algae will carry on the photosynthetic reactions necessary to growth and survival. The float means 10 thus function in precisely the area of greatest algae growth, to provide resting and breeding places for algae predators. According to the laws of nature, such algae predators will increase in numbers as may be necessary to maintain an effective trophic balance between themselves and the algae growths upon which they feed.

In general, the dissolved oxygen requirements to sustain life of different types of aquatic organisms varies considerably. Thus minute forms of aquatic animals such as zooplankton, annelids, odonata nymphs, aquatic snails and the like require very small amounts of dissolved oxygen, ranging as low as 1 part per million. Slightly higher forms such as aquatic beetles and insects, mosquito fish and the like require about 1 to 2 parts per million of dissolved oxygen, whereas carp, goldfish and similar aquatic animals generally require up to 3 parts per million. Larger fish such as bass and cat fish may require 3 to 5 parts per million whereas trout and similar active fish may require proportions in excess of 5 parts per million. The level of penetration of dissolved oxygen beneath the surface is very small, ranging to a maximum of about 9 parts per million in the upper few inches of water surface, and moreover will vary substantially with the time of the day. In studies of marshlands, inland ponds and conventional open waters, the amount of dissolved oxygen available for aerobic organisms is customarily studied along the shore line in the littoral zone since, in the absence of a place to rest, minute animal organisms will not survive on the open surface waters. With particular reference to FIG. 5, the proportion of dissolved oxygen found in the littoral zone will be at its highest shortly after noon and just before sunset, ranging for example, to 20 to 30 parts per million. With the setting of the sun, the amount of dissolved oxygen rapidly diminishes so that just before sunrise, the proportion of dissolved oxygen will drop to 1 to 2 parts per million, or just above minimum life standards for the micro habitat of the littoral zone. In open surface waters, the proportion will drop even lower. Consequently, animal life capable of functioning as algae predators will normally be found along the shore line in the so-called littoral zone of the open bodies of water. The necessity and reason for this is generally presented in the graphic illustration of FIG. 5.

By positioning the float means 10 adjacent the surface of an open body of water, an artificial littoral zone is formed which enables the colonies of plant and animal life on the float means 10 to accommodate to normal variations in the amount of dissolved oxygen which occur in such upper surface regions.

Considering marshlands, open ponds and similar bodies of water, algae are the basic producers of the food chain. In the littoral zone, a healthy growth of single-celled algae (scenedemus or equal) constitutes a desirable and effective way of oxygenating the water and keeping the food chain healthy and well fed, provided the proportion of algae does not exceed about 50 milligrams per liter. Excess algae that cannot be consumed by the food chain will eventually die and fall to the bottom to make up the bottom ooze (benthos). In ponds and marshlands, the dead algae cells plus bacterial slimes feed the life chain of anaerobic organisms which are known for their ability to convert carbohydrates to odoriferous methane gas and hydrogen sulfide and for their capacity to cause plugging of the bottom soil. Thus, excess algae are a key factor in the "smothering" of numerous inland ponds and lakes.

In accordance with the present invention, "excess" colloidal waste particles, single-celled bacteria and algae are attracted to and held by the bark fibers of the float means 10. During sunlight hours, there will be an ample oxygen supply from the algae which has the capacity to increase the level of dissolved oxygen in the upper ten centimeters of the surface waters to about 30 parts per million. This is a substantial increase from the normal 2 to 9 parts per million that might be introduced through the water's surface by diffusion. The minute animal life is therefore well supplied with dissolved oxygen during the daylight hours and during the period from midnight to dawn will survive on the reduced proportions of dissolved oxygen in the same manner as the aquatic animal life and algae predators in the littoral zone along the shore line. In effect thereto, the float means provide an artificial "shore line", although spaced far from the actual shore line in central regions of an open body of water. By way of illustration, a float means 10 having the properties and dimensions previously described provides an artificial shore line which is approximately equivalent to two meters (80 inches) of actual shore line, while simultaneously providing a habitat suitable for desired forms of odonata, corrid nymphs, crustacea, zooplankton and like algae predators. In brief, the float means 10 provide living and breeding places for all microelements of a vegetative marsh by attracting algae waste particles, single-celled bacteria, and the like, which constitute the bottom of the food chain, while simultaneously attracting and supporting algae feeders such as aquatic snails, rotifers, coleoptera, larvae and the like which consume and use up these materials. Accordingly, through use of the ecological system and method illustrated, inland ponds and marshlands that were once thick with algae are being cleared and brought into a state of health that attracts fish, birds, and wild fowl in great numbers. The ecological float system of the present invention is therefore ideal for ecological and reclamation purposes and also for mankind in general, in that it provides a simple inexpensive means for restoration and proper management of open marshlands, inland lakes, and waterways.

As noted, the embodiment of the invention illustrated in FIGS. 1-4 is particularly adapted to use in open bodies of water such as might occur naturally in nature. FIG. 6 illustrates a system of apparatus which might similarly be adapted to separate zones in such naturally occuring bodies of water or, alternatively, to man made zones or ponds in a managed marsh for ecological or commercial purposes. With reference to FIG. 6, an inflow of discharged waste fluid from a municipal or industrial sewage plant or the like is introduced to the system through the line 40. Typically, this inflow will include suspended particles of waste solids, protozoa, colloids, single celled bacteria and like wastes. In natural bodies of water, these minute food particles and bacteria make up the lower end of food chain. From line 40, the waste fluid passes through a control weir 42, at a desired rate, into an algae growth tank or pond 44. Within the pond 44, a plurality of the float means 10 are positioned in substantially the manner previously described, that is, the float means 10 are spaced along stringers 16 extending between the spaced-apart float members 14. The general dimensions of those floatation units are approximately 40 centimeters (16 inches) in diameter and no more than about 50 centimeters (18 inches) in depth. As before, the float members 14 can be movably held in place by stakes or like spacing supports 22.

In the pond 44, a managed growth of algae and algae predators can be carried on in the favorable environment provided by the float means 10, within the clusters of bark fibers held by the discs 26 and within the perforated bags 36. Thus, as oxygen is transferred into the upper surfaces of the pond by diffusion and (optionally) by aeration, a bioflac (slime) forms which is principally made up of particles of waste and single-celled bacteria and algae. In the described environment, the bacteria consume the waste and each other, converting carbohydrates of various kinds into $CO_2$ and $H_2O$. At the same time, the minute food particles and bacteria are consumed by various microorganisms such as aquatic snails, rotifers, crustacea, zooplankton and the like, which similarly convert the algae and other food into $CO_2$ and energy. Other efficient aerobic scavengers include coleoptera (water beetle), corixadae (water boatmen), and the aquatic instars and larvae of various insects such as odonata (dragonfly, damsel fly) and aquatic annelids (worms). All of these life forms must live in water containing dissolved oxygen which, in this instance, may be provided at least in part by diffusion through the surface (or by aeration) but, principally, is provided by the growth of algae. As noted previously, algae, through photosynthesis, will function to substantially increase the level of dissolved oxygen in the surface area of the ponds (e.g., to about 30 ppm), thus greatly encouraging the growth of algae predators. By way of illustration, an analysis of a float means 10 after four months on the surface of a pond as illustrated at 44, yielded the following results: 4 egg masses of the odonata (dragon fly) genus, damsel fly larvae, aquatic snails and eggs and several species of annelids (worms). In addition, water boatmen, aquatic beetles and daphnia were observed in the vicinity of the floatation unit. In a managed system, small fish such as mosquito fish, sun fish, bluegills and the like might also be maintained in the pond 44, where they could feed on the algae predators and other small aerobic organisms carrying on their life cycle in the float means 10.

From the pond 44, effluent can be discharged through the line 46 to a fish pond 48 where Koi carp, gold fish or other commercial fish might be raised. The purpose would be to provide a commercial income from the managed marsh operation to offset expenses. Alternatively, excess algae, odonata, corids, nymphs, coleoptera, etc. (collectively called "biota") can be discharged as an effluent from pond 48 through the line 50 to a harvesting unit 52. The unit 52 may be in the form of a simple filter unit which screens out the biota for processing and sale as a high protein animal or fish food. The effluent can be discharged at this point (arrow 54) or, preferably, a substantial portion can be recycled through pumping means 56 and line 58 to a large pond 60, which function as a vegetative marsh. For example, the pond 60 can be planted with alkali bull rush, brass buttons or similar marshland vegetation for use as food by game birds and water fowl. The system is completed by the recycle discharge line 62, pump 63, and the recycle feed lines 64 and 66 leading to the ponds 44 and 48, respectively. This recycle flow can be suitably controlled by a 3-way valve 68, which also permits discharge of the effluent liquid at 70, for example, for use in irrigation or for other useful purposes.

As a generalized example of the invention, related specifically to the ecological system and method illustrated in FIG. 6, a flow of discharge fluid enters the system through the control weir 42 at a very slow linear rate of feed, for example, 1 centimeter per second ½ inch per second). The inflow passes to the pond 44, which may be of any desired dimension and which should be about 0.5 meters (20 inches) deep. In general, each separate float means 10 should receive about 9500 liters of inflow per day (250 gpd). It will be appreciated that the pond 44 is the production marsh where algae, odonota, corids, coleoptera, etc. are produced and consumed. The effluent from this pond contains various amounts of the indicated biota. As previously noted, this biota can serve as food for almost any purpose, for raising commercial fish in the pond 48 or to deposit a commercial feed product at the screening device 52. Satisfactory screening means for the latter purpose can comprise a simple flat screen of approximately 20 mesh (1 mm.). While a portion of the effluent can be discharged at this point, through line 54, the major portion is circulated through the recycle line 58, at a more rapid rate approximating 10 centimeters per second (4 inch/sec.), to the vegetative marsh or pond 60. The marsh 60 should be relatively shallow, say 20 centimeters (8 inches) deep, as such depth provides ideal conditions for the growth of brass buttons, alkali bull rush and similar useful vegetation.

From the foregoing, it should be apparent that the ecological system and method of the present invention provides a number of advantages, particularly as respects the discharge of waste fluids into open bodies of water, streams and the like. Specifically, it provides the means to uniformly distribute artificial surface areas over water masses of appreciable size and dimension to effectively simulate shoreline conditions as respects micro-elements (plant and animal) entering or induced to enter into the involved area. The system prticularly provides a means to establish and maintain an essential trophic balance between algae and algal feeders by providing increased areas for life and surface breeding of a variety of algae predators. As particularly relates to waste waters containing substantial proportions of colloidal solids, for example, waste water discharged from sewage plants, the present invention eliminates the necessity for a deep water out fall. Instead, the bark fiber systems incorporated into the individual floatation units attract and hold the colloidal solids, thus feeding the balanced colonies of micro plant and animal life contained therein while avoiding the possibility for contamination of the actual shore line. In aerated ponds or streams, the described float means provide a suitable habitat for members of the micro community which would otherwise be unable to live in the rapidly swirling waters. The system and method of the invention thus provides particular advantages in the protection, maintenance and reclamation of inland waters which are essential to attracting fish, birds, wild fowl, and game.

It may be additionally noted that the ecological system and method of the present invention, combining a system for growth of algae and algae predators without disruption of the trophic balance therebetween, produces a synergistic effect. Thus, a natural or artificially stimulated growth of algae can be controlled in a balanced manner with parallel growth of algae predators, under essentially controlled conditions. The growth rate of dependant animal life as well as the accelerated growth of valuable plants, can likewise be carried out in controlled manner, for example, as at 48 and 60 in the embodiment of FIG. 6. Of particular significance, as noted is the fact that the ecological system and method of the invention is readily adaptable to existing bodies of open water such as inland ponds, marshlands and lakes, to provide a means for controlling destructive algae growths or "blooms" due to periodic or continuing discharge of pollutants in the form of municipal and industrial or sewage wastes.

What is claimed is:

1. In a process for maintaining the trophic balance between algae, algal feeders and the like, in an open body of water subject to eutrophication, the steps of isolating a profusion of substantially individualized bark fibers by adhering the same to relatively flat flotation disc members forming self-contained flotation units of organic material having a specific density less than that of water, said step of adhering the fibers being carried out by applying an organic adhesive coating to said flotation disc members and bringing said bark fibers into contact with said coating, said bark fibers functioning as a means to attract and hold excessive nutrient deposition in the form of colloidal wastes, single-celled bacteria, cytoplankton and the like and aquatic algae produced thereby while at the same time providing a safe habitat for minute animal organisms capable of feeding thereon in the form of algae predators and feeders in the form of crustacea, rotifers, snails, zooplankton and the like, and dispersing said self-contained bark fiber flotation units in an upper zone of said body of water adjacent to and beneath the surface thereof and in the path of likely growth and movement of algae and algae nutrients, said upper zone for dispersal of said bark fiber units being sufficiently shallow in depth to be relatively rich in dissolved oxygen as respects lower zones of said body of water.

2. A process as in claim 1 wherein said isolation step is additionally carried out by suspending individualized bark fibers in perforated enclosures supported on flotation units.

3. A process as in claim 1 wherein said dispersion step is carried out within an upper zone of said open body of water at a depth no more than about 50 centimeters below the surface thereof.

4. A process as in claim 1 wherein said dispersion step is carried out by positioning flotation units freely on the surface of said open body of water.

5. A process as in claim 1 wherein said dispersion step is carried out by a restricted positioning of flotation units on the surface of said body of water through placement of anchor units on the bottom of said body of water.

6. Apparatus for promoting a trophic balance between algae, algal feeders and the like in open bodies of water subject to eutrophication, comprising organic float means, said float means including relatively flat flotation disc members of a specific density less than that of water, clusters of substantially individualized bark fibers, and organic adhesive means securing said clusters of bark fibers to said flotation disc members to form essentially self-contained flotation units wherein the individual bark fibers are positioned in desired spatial relationship with respect to one another and to said disc members, said clusters of bark fibers serving to attract and hold excessive nutrient deposition in the form of colloidal wastes and aquatic algae produced thereby while at the same time providing a safe habitat for minute animal organisms capable of feeding thereon in the form of algae predators and feeders.

7. Apparatus as in claim 6 wherein said organic float means include flotation members of open cellular construction to provide air pockets therein.

8. Apparatus as in claim 6 wherein said individualized bark fibers are redwood fibers having a thickness of no greater than about 1 millimeter and a length of no greater than about 1 to 10 centimeters.

9. Apparatus as in claim 6 wherein there is additionally provided means for securing bark fibers to said flotation disc members in a form of a perforated enclosure supported thereon.

10. Apparatus for promoting a trophic balance between minute animal feeders and excessive colloidal nutrient depositions in open bodies of water subject to eutrophication, comprising a plurality of organic float means including relatively flat flotation disc members of a specific density less than that of water, clusters of substantially individualized bark fibers, organic adhesive means securing said clusters of bark fibers to each of said flotation disc members to form essentially self-contained flotation units on which the bark fibers are positioned in desired spatial relationship with respect to one another and to said float means, pairs of spaced apart float members, means positioning said sef-contained flotation units between said spaced apart float members, and means positioning said spaced apart float members and the intermediate self-contained flotation units above and beneath the upper surface of an open body of water whereby said clusters of substantially individualized bark fibers are held in an upper relatively oxygen-rich zone of said body of water.

11. Apparatus as in claim 10 wherein anchor means are provided to position said spaced apart float members in desired locations with respect to the surface and bottom of said open body of water.

12. Apparatus as in claim 11 wherein said anchor means comprise vertical stake means positioned and held in place in a bottom surface of said open body of water.

13. In a system of apparatus for promoting a trophic balance between minute animal feeders and excessive colloidal nutrient depositions in an open aqueous system, first enclosure means forming and holding a first open body of water, a plurality of organic float means positioned adjacent the surface of said first body of water, said organic float means including relatively flat flotation disc members to which a profusion of substantially individualized bark fibers are adhesively attached by means of an organic adhesive coating said adjacent said first body of water, conduit means interconnecting said first and second enclosure means for carrying effluent from said first body of water to said second body of water, said second body of water containing therein animal feeders of a size capable of digesting minute animal feeders from said first open body of water, third enclosure means forming and holding a third body of water adjacent at least said second open body of water, additional conduit means interconnecting said second and third enclosure means for carrying effluent from said second body of water to said third body of water, said third open body of water containing plants and nutrients capable of supporting a still larger size of animal life, inlet means circulating feed liquid containing colloidal waste materials to said first open body of water, and circulatory means for selectively circulating effluent through said conduit means from said first open body of water to said second open body of water and through said additional conduit means from said second body of water to said third open body of water.

14. A system of apparatus as in claim 13 including screening means between at least said second and third open bodies of water to remove excess zooplankton and like minute animal life as a commercial product.

15. A system of apparatus as in claim 13 wherein means including valve and conduit means are provided to recycle at least a portion of effluent from said third body of water to said first and second bodies of water.

* * * * *